United States Patent [19]

Ritsema

[11] 4,082,166

[45] Apr. 4, 1978

[54] DISC BRAKE HAVING RETENTION DEVICE

[75] Inventor: Irving R. Ritsema, South Bend, Ind.

[73] Assignee: The Bendix Corporation, South Bend, Ind.

[21] Appl. No.: 764,607

[22] Filed: Feb. 1, 1977

[51] Int. Cl.² .................... F16D 55/224; F16D 65/02
[52] U.S. Cl. ................................................. 188/73.6
[58] Field of Search .................... 188/73.3, 73.5, 73.6

[56] References Cited

U.S. PATENT DOCUMENTS

| 3,941,216 | 3/1976 | Burgdorf | 188/73.6 X |
| 3,958,667 | 5/1976 | de Gennes | 188/73.6 X |

Primary Examiner—Duane A. Reger
Attorney, Agent, or Firm—Paul David Schoenle; Ken C. Decker

[57] ABSTRACT

A disc brake includes an outer shoe retention device that releasably connects the outer shoe and its corresponding backing plate to a reaction arm portion of a caliper. The caliper reaction arm is provided with an opening and the outer shoe backing plate is provided with a tab and a flange that extend into the opening. The retention device comprises an elliptical spring with end projections that are inserted in slots on the flange and a cross piece that is releasably engaged with the tab. The reaction arm opening includes grooves that receive ear portions of the elliptical spring in order to mount the elliptical spring on the reaction arm and the elliptical spring is accessible from the outside of the caliper via the reaction arm opening so that the spring is releasable to remove the outer shoe and backing plate.

2 Claims, 6 Drawing Figures

DISC BRAKE HAVING RETENTION DEVICE

BACKGROUND OF THE INVENTION

Various arrangements are provided by the prior art to attach a pair of friction elements to a caliper. As the pair of friction elements must be removed for replacement when worn to a predetermined dimension, the arrangement must be accessible for easy separation of the friction element from the caliper.

With reference to the outer friction element, opposite the caliper hydraulic actuator, the caliper includes a reaction arm portion for carrying the outer friction element. It is desirable to provide a retention device for securing the outer friction element to the reaction arm which is simple and accessible from the exterior of the caliper.

SUMMARY OF THE INVENTION

The present invention provides a retention device for an outer friction element in a disc brake. The disc brake includes a caliper that extends around a portion of the outer periphery of a rotor and the caliper forms an opening on a reaction arm portion opposite a hydraulic actuator carried by the caliper. The outer friction element forms a tab and a flange, both of which extend into the reaction arm opening. In accordance with the invention an elliptical spring is mounted in a pair of matching grooves on the reaction arm opening and the elliptical spring is provided with at least one end projection that extends into a slot on the flange and with a cross-piece arm that releasably engages the tab.

As the spring is flexed from its rest position for mounting in the pair of matching grooves, the spring yieldably engages the tab and flange to oppose any axial or radial movement of the outer friction element relative to the reaction arm of the caliper.

It is an object of the present invention to provide a spring retention device for an outer friction element on a disc brake that is accessible from the exterior of the disc brake and is easily removed therefrom to disassemble the outer friction element from the disc brake.

DETAILED DESCRIPTION

Figure 1:
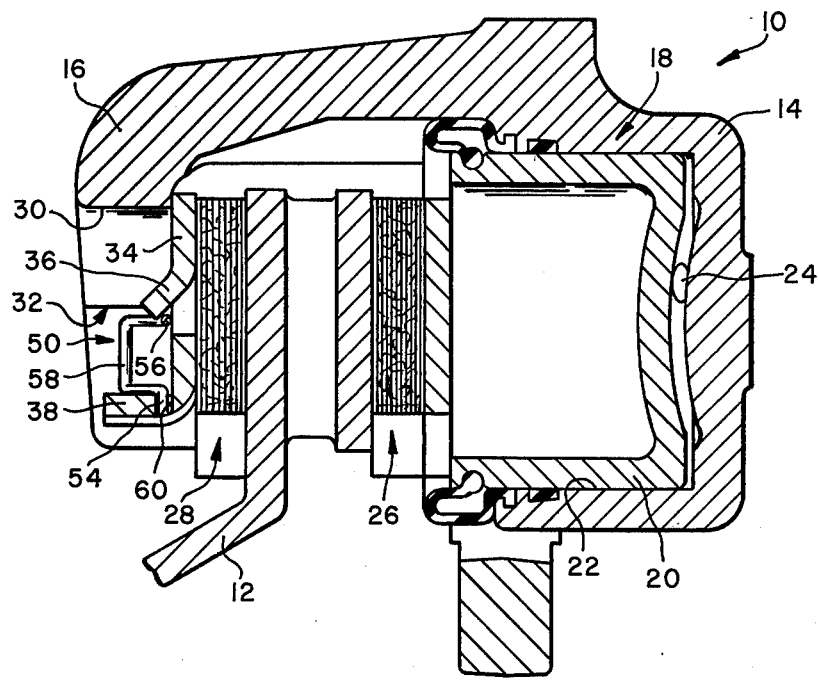
FIG. 1 is a cross-sectional view of a disc brake.

A disc brake, generally referred to as numeral 10, is indicated in FIG. 1. A rotor 12 is rotatably connected to a wheel assembly (not shown) and a caliper member 14 is fixedly secured to a non-rotatable portion of the wheel assembly. The caliper member 14 extends over a portion of the periphery of the rotor 12 and includes a reaction arm 16. A hydraulic actuator 18, such as a piston 20, is slidably mounted within the caliper member bore 22 and a passage 24 communicates fluid to the caliper member bore 22 in order to urge the piston toward the rotor 12.

An inner friction element or brake shoe 26 is slidably carried by the caliper in a manner well known in the art and is engageable with the hydraulic actuator 18 upon a brake application for movement toward the rotor 12. In order to frictionally engage the surface of the rotor 12 opposite the inner friction element 26, an outer friction element or brake shoe 28 is carried by the reaction arm 16 in a manner which will be described hereinafter.

Figure 2:
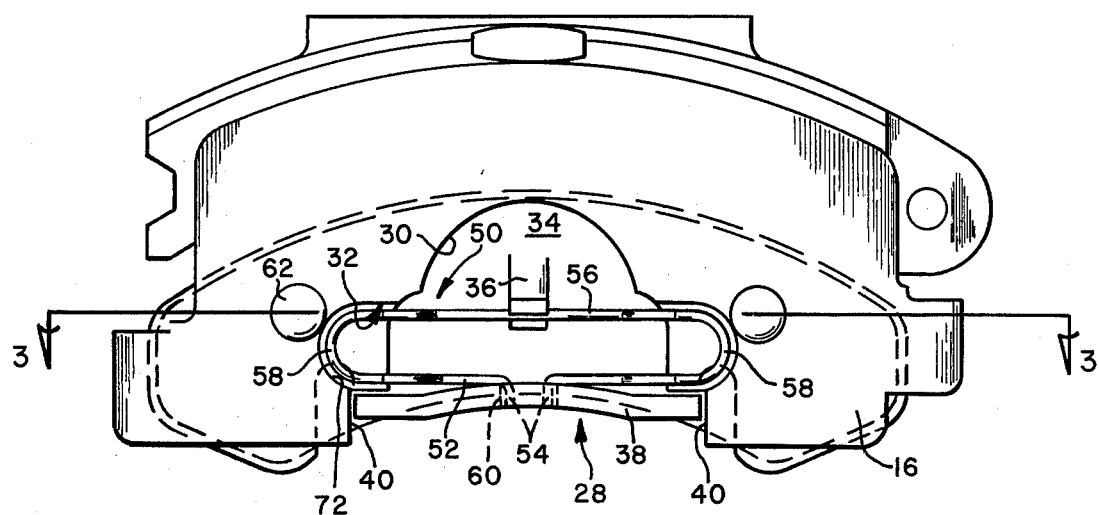
FIG. 2 is a full left side view of the disc brake of FIG. 1.

Turning to FIG. 2 it is seen that the reaction arm 16 is provided with an opening 30 which includes opposing grooves at 32. An outer backing plate 34 for the corresponding outer shoe 28 forms a tab 36 which is punched axially outwardly from the backing plate 34. An axially outwardly turned flange 38 on the backing plate 34 extends into the opening 30 along with the tab 36. Adjoining the grooves at 32 are guide surfaces 40 which oppose lateral movement of the flange 38 within the opening 30 to take up the torque transmitted to the outer shoe 28 during braking.

In accordance with the invention a retention means 50 comprises an elliptical spring 52 having end projections 54, a cross-piece arm 56 and arms 58. The retention means is mounted on the reaction arm 16 by inserting the arms 58 in the grooves 32 which receive the arms 58 in substantially close fit. A slot on the flange 38 receives the end projections 54 and the cross-piece arm 56 is yieldably urged into engagement with the tab 36. In the installed condition the retention means 50 abuts the arms 58 with the bottom of the recess 32 and releasably engages the end projections 54 with the slot 60 and the cross-piece arm 56 with the tab 36 to resiliently connect the retention means 50 with the outer friction element 28 and the reaction arm 16. Consequently, the friction element 28 is releasably connected to the reaction arm 16 so that the caliper disc brake 10 can be easily assembled to the wheel assembly with friction elements 26 and 28 facing opposite sides of rotor 12. In addition, rattle or vibration between the outer friction element 28 and the reaction arm 16 is opposed by the restoring force of the elliptical spring 52 in the installed condition.

In order to replace the outer friction element 28, the cross-piece arm 56 of the elliptical spring 52 is moved radially and axially away from the tab 36 so that the outer friction element 28 and corresponding backing plate 34 are free to drop radially out of the caliper 14. If optional centering posts at 62 are provided for transferring torque to the reaction arm 16, the outer friction element 28 must be moved axially inwardly before it will drop out of the caliper 14.

Figure 3:
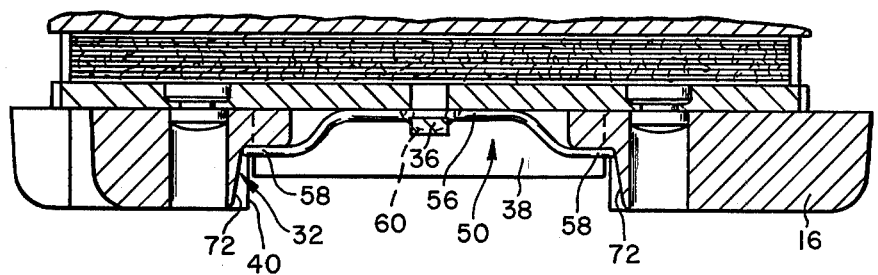
FIG. 3 is a partial top view of FIG. 2 taken along line 3—3.
Figure 4B:
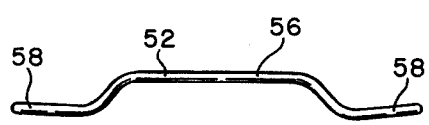
FIGS. 4a and 4b are respective front and top views of the elliptical spring of FIG. 2 illustrating the same in its rest position.
Figure 4A:
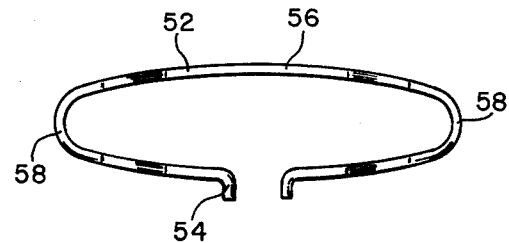

Turning to FIGS. 4a and 4b it is seen that the elliptical spring 52 in its rest position is substantially two dimensional. The end projections 54 and the cross-piece 56 extend downward and upward, respectively, so that they are resiliently urged into engagement with the slot 60 and tab 36, respectively, in the installed condition. Viewing FIG. 3, it is also seen that the arms 58 are bent outwardly in the installed condition, so that the axial restoring force of the spring 52 maintains the outer friction element 28 in engagement with the reaction arm 16 of the caliper member 14 when the cross-piece arm 56 is engaged with the tab 36.

Figure 5:
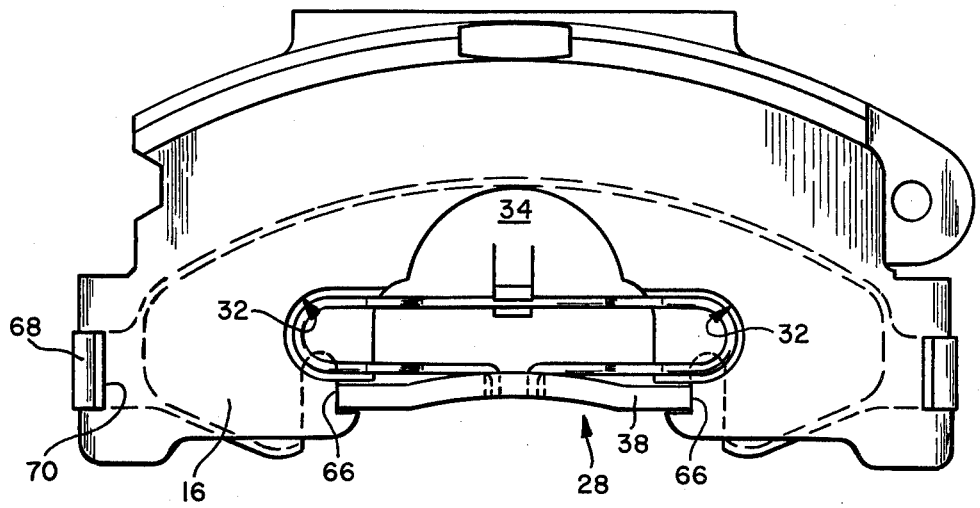
FIG. 5 is a partial left side view of the disc brake of FIG. 1, illustrating a modification thereof.

In the modified embodiment of FIG. 5, the flange 38 extends axially outwardly into recesses at 66 on the reaction arm 16, which are adjoining the grooves 32. In addition, the centering tabs are replaced by extensions of the backing plate at 68 which extend axially outwardly into a second pair of recesses at 70. The recesses at 66 and 70 receive the extensions 68 and the flange 38, respectively, in order to take up the torque developed during braking between the outer friction element 28 and the reaction arm 16, as the outer friction element 28 frictionally engages the rotor 12.

As illustrated in FIG. 3, the groove 32 optionally includes tapered side walls 72, which are substantially the same curve as the arms 58. Therefore, the elliptical spring 52 can resiliently engage the bottom of the grooves 32 or the tapered side walls 72 of the grooves 32 when mounted on the reaction arm 16. Consequently, if the elliptical spring 52 is resiliently engaged to the tapered side wall 72 and if the curve of the tapered side wall is substantially the same as the curve of arms 58, the elliptical spring 52, not only resiliently urges the outer friction element into engagement with the reaction arm 16, but also operates to resiliently oppose any radial movement between the outer friction element 28 and the reaction arm 16.

Thus, it is apparent that there has been provided, in accordance with the invention, an elliptical spring retention means 50 which eliminates rattle between an outer friction element and a caliper member and also resiliently connects the outer friction element to the caliper member. Moreover, the elliptical spring retention means 50 is easily accessible, via opening 30, and grooves 32 from the exterior of the caliper member in order to disengage the spring from the outer friction element for removing the same from the caliper member.

While the invention has been described with reference to a specific embodiment, it is evident that many alternatives, modifications and variations will be apparent to those skilled in the art. Accordingly, these alternatives, modifications and variations are embraced within the scope of the appended claims.

I claim:

1. A disc brake comprising:

a rotor;

a caliper member extending over a portion of said rotor outer periphery;

a pair of friction elements carried by said caliper member at axially opposite sides of said rotor; and resilient retention means releasably engaging said caliper member and one of said friction elements;

said one friction element including a backing plate having a tab and a flange and said resilient retention means engaging said tab, said flange and said caliper member to yieldably secure said one friction element to said caliper member;

said resilient retention means comprising a substantially elliptical spring, said substantially elliptical spring including end projections that extend into a slot on the flange, said spring also including a cross-piece arm that engages with the tab and a pair of arms between the end projections and the cross-piece arm that yieldably engage said caliper member to releasably connect said one friction element with said caliper member.

2. The disc brake of claim 1 in which said pair of arms engage corresponding grooves on said caliper member and said grooves include tapered side walls, said spring being engageable with said tapered side walls and said tab to oppose radial and axial movement between said one friction element and said reaction arm.

* * * * *